(12) United States Patent
Nair

(10) Patent No.: US 10,193,836 B2
(45) Date of Patent: Jan. 29, 2019

(54) PHYSICAL MAIL DELIVERY VIA EMAIL

(71) Applicant: PAYPAL, INC., San Jose, CA (US)

(72) Inventor: Rahul Nair, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 257 days.

(21) Appl. No.: 14/985,274

(22) Filed: Dec. 30, 2015

(65) Prior Publication Data
US 2017/0195268 A1 Jul. 6, 2017

(51) Int. Cl.
H04L 12/58 (2006.01)
(52) U.S. Cl.
CPC ............ *H04L 51/066* (2013.01); *H04L 51/12* (2013.01)
(58) Field of Classification Search
None
See application file for complete search history.

(56) References Cited

U.S. PATENT DOCUMENTS

| 7,693,942 | B2 | 4/2010 | Nale | |
|---|---|---|---|---|
| 8,346,674 | B2 | 1/2013 | Agrawal et al. | |
| 2002/0002590 | A1* | 1/2002 | King | G06Q 10/107 709/206 |
| 2002/0165729 | A1* | 11/2002 | Kuebert | G06Q 10/08 705/338 |
| 2007/0156415 | A1* | 7/2007 | Foth | G06Q 10/08 705/336 |
| 2012/0179622 | A1* | 7/2012 | Amato | B07C 3/00 705/332 |
| 2013/0031188 | A1* | 1/2013 | Sipe | G06Q 10/08 709/206 |
| 2017/0083861 | A1* | 3/2017 | Aryeetey | G06Q 10/0833 |

* cited by examiner

*Primary Examiner* — Mohamed Ibrahim
(74) *Attorney, Agent, or Firm* — Haynes and Boone, LLP

(57) ABSTRACT

Systems and methods for delivering physical mail via email are provided. A mail delivery service provider scans the front and back of physical mail items and converts the physical mail to an email message. From the email inbox, a user can trash the email and not allow it to reach the user's physical mailbox and/or respond to the physical mail virtually.

20 Claims, 4 Drawing Sheets

PHYSICAL MAIL DELIVERY VIA EMAIL

BACKGROUND

Field of the Invention

The present invention generally relates to delivering physical mail via electronic mail systems, and more particularly to converting physical mail into emails and transmitting the emails to designated recipients.

Related Art

Despite the transition of many forms of communication to electronic mail, most individuals, companies, and other groups or organizations are still dependent on mail in the form of physical mail. Many people use mail for personal and business communications and transactions. In many cases, mail provides a communication service that is both necessary and important to the mail recipient. Physical mail may be delivered by the postal service or other similar contracting or delivery services.

People receive a lot of physical mail in their mailboxes on a regular basis. Most of the mail received is junk mail (e.g., advertisements, local deals, promotional materials, etc.). Some mail may be important (e.g., bills, notices, etc.). Certain people may not check their mailboxes on a daily basis and miss important deadlines.

Accordingly, a need exists for systems and methods that provide a mechanism for providing users easy and early access to their physical mail.

Figure 1:
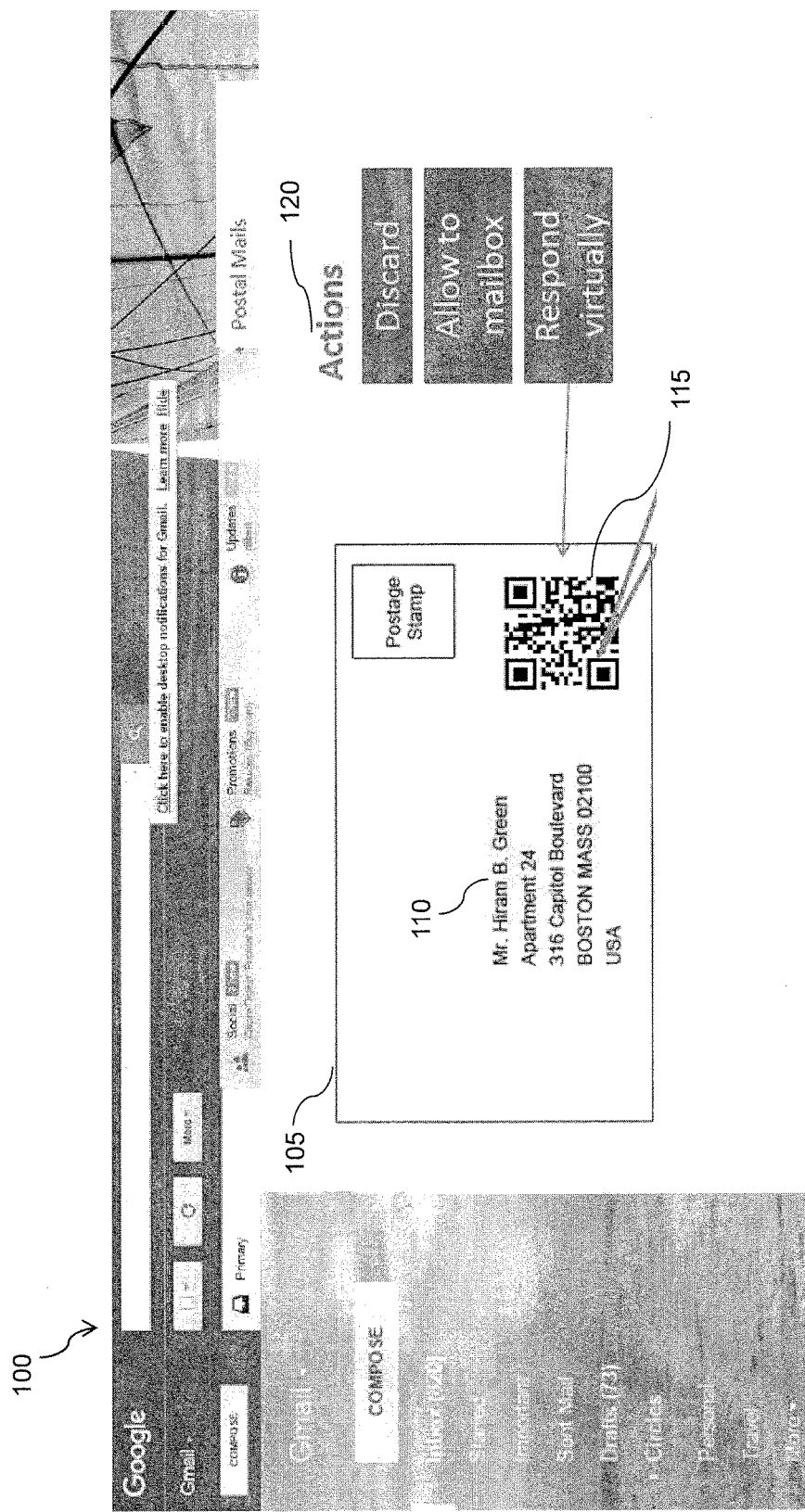
FIG. 1 is a screenshot of an email that was converted from physical mail according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods that provide for physical mail delivery via electronic mail ("email"). Email is generally delivered within minutes while physical mail usually takes days to deliver. It is easier to forward email and provide copies of email to multiple users. Most email accounts can be accessed from anywhere in the world via the Internet, making it especially convenient for business travelers. Email is less expensive to send and typically quicker to compose. Stored email is also easier to search than physical mail. People also tend to check email multiple times a day.

A user subscribes to a physical mail conversion service offered by a mail delivery service provider (e.g., Federal Express, U.S. Postal Service, UPS, or DHL). The mail delivery service provider receives physical mail and scans the front and/or back of the physical mail (including the envelope). From the scanned physical mail, the mail delivery service provider retrieves who the recipient of the physical mail is and checks its database to determine if the recipient is a subscriber of the service. If the recipient is a subscriber, the mail delivery service provider converts the physical mail to an email, retrieves the email address of the recipient from a database, and sends the email to the recipient. In various embodiments, the physical mail is converted to an email containing text and embedded images. In other embodiments, the physical mail is converted to an email attachment, or a link to an electronic version of the physical mail is provided in the email.

In some embodiments, the mail delivery service provider sends the email to the recipient before the physical mail is delivered to the recipient. When the recipient receives the email, he or she can view the email and decide to delete the email. Deleting the email indicates to the mail delivery service provider that the recipient does not want that piece of physical mail so the mail delivery service provider refrains from delivering the physical mail to the recipient. In certain embodiments, the mail delivery service provider informs the sender of the physical mail that the recipient does not desire to receive such physical mail. In this way, the sender can save money by not sending any additional pieces of physical mail to the recipient.

In certain embodiments, the physical mail may need or request a response from the recipient. For example, the physical mail may include a form that needs to be filled out or a survey. In these instances, the sender can include a uniform resource locator (URL) (e.g., a link to an electronic version of the form or a link to a website), embed a URL in a Quick Response (QR) code, or both. The URL and/or the QR code may be encrypted. When the mail delivery service provider scans the physical mail with the URL and/or QR code, the URL and/or any information in the QR code can be retrieved. Information in the QR code includes a link to a website that includes the form, information on how to respond to the physical mail by email, and/or all information contained in the physical mail. The URL and/or information in the QR code can then be provided directly in the body of the email. For example, a link embedded in the QR code can be in the email rather than the QR code itself. When the recipient clicks on the link in the email, the corresponding website is launched, and the recipient can complete a form online or otherwise respond to the physical mail. In other embodiments, the QR code remains a QR code in the body of the email. When the recipient scans or reads the QR code in the email, the recipient can be taken to a website embedded in the QR code.

Referring to FIG. 1, an email inbox 100 is illustrated. An email that was converted from physical mail is shown. The body of the email includes an image of an envelope 105, where the envelope 105 includes the name and address 110 of the recipient. The envelope 105 also includes a QR code 115. The sender includes the QR code 115, in this embodiment, on the front of the envelope 105. The QR code 115 allows a user to respond virtually to the physical mail because the QR code is linked to a website or other URL.

A user can perform certain actions 120 on the email. The user can choose to discard or delete the email, which informs the mail delivery service provider to refrain from delivering the physical mail. The user can also choose to have the physical mail delivered to his or her physical mailbox. Finally, the user can decide to respond to the physical mail virtually.

Advantageously, users can receive physical mail and email at the same time, using the same email account. Users can receive physical mail while traveling and avoid returning home to surprises found in mail accumulated while they were away. Instead of collecting mail and express mailing physical mail to traveling employees, employees can get their mail same day at a lower cost.

In addition, users get early visibility into their physical mail since they check emails on a more regular basis. In various embodiments, the email is sent to the user as soon as (or very shortly after) the physical mail reaches the mail delivery service provider. The user can conveniently trash the physical mail with a click of a button and not let his physical mailbox get clogged.

Figure 2:
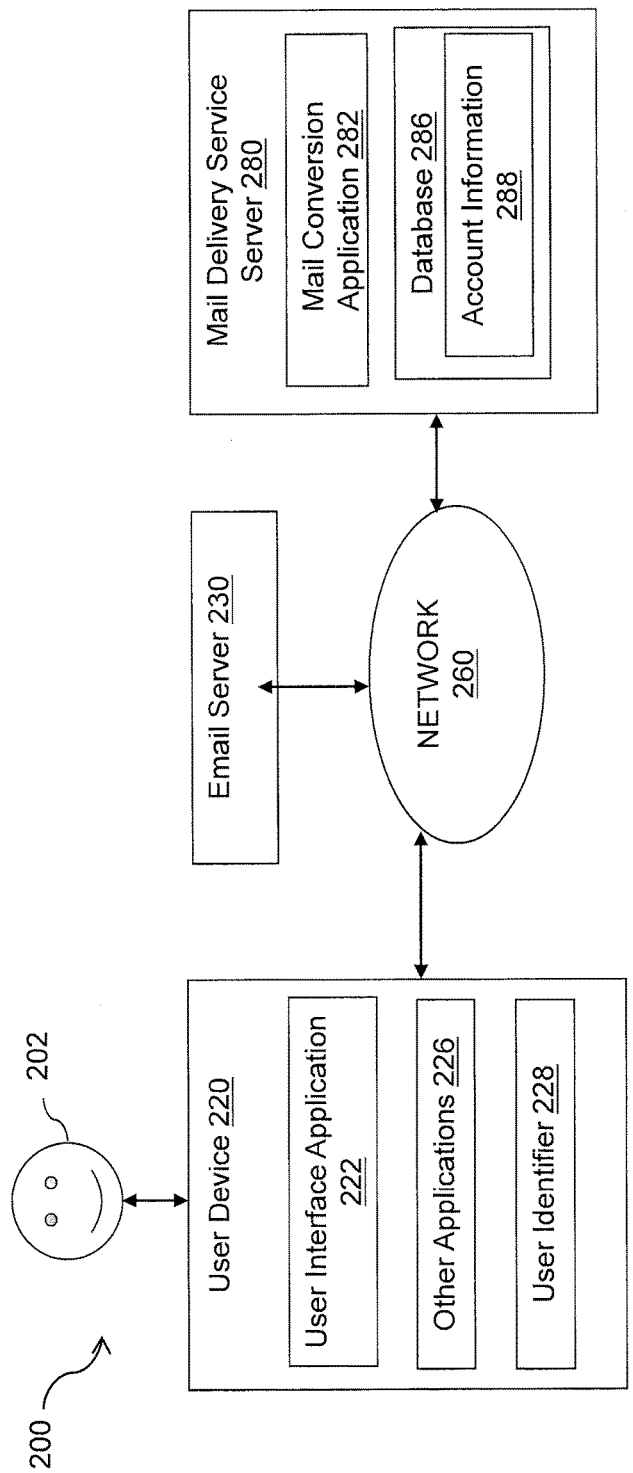
FIG. 2 is a block diagram illustrating a system for delivering physical mail via email according to an embodiment of the present disclosure.

FIG. 2 shows one embodiment of a block diagram of a network-based system 200 that is configured to deliver physical mail via email according to an embodiment of the present disclosure. Any of the systems or machines shown in FIG. 2 may be, include, or otherwise be implemented in a special-purpose (e.g., specialized or otherwise non-generic) computer that has been modified to perform one or more functions described herein for that system or machine. As shown, system 200 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 2 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, system 200 includes a user device 220 (e.g., a smartphone), an email server 230, and at least one mail delivery service provider server or device 180 (e.g., network server device) in communication over a network 260. Network 260, in one embodiment, may be implemented as a single network or a combination of multiple networks. For example, in various embodiments, network 260 may include the Internet and/or one or more intranets, landline networks, wireless networks, and/or other appropriate types of communication networks. In another example, network 260 may comprise a wireless telecommunications network (e.g., cellular phone network) adapted to communicate with other communication networks, such as the Internet.

User device 220, in one embodiment, is utilized by a user 202 to interact with mail delivery service provider server 280 over network 260. User device 220, in various embodiments, may be implemented using an appropriate combination of hardware and/or software configured for wired and/or wireless communication over network 260 and for performing the functions described herein. In various implementations, user device 220 may include at least one of a smartphone, wireless cellular phone, satellite phone, tablet (e.g., iPad™ from Apple®), laptop computer, wearable device (e.g., smart watch or Google Glass), notebook computer, desktop computer, and/or other types of computing devices.

User device 220, in one embodiment, includes a user interface application 222, which may be utilized by user 202 to access applications and to provide instructions to mail delivery service provider server 280 over network 260. In one aspect, user 202 may login to an account related to user 202 via user interface application 222.

In one implementation, user interface application 222 comprises a software program, such as a graphical user interface (GUI), executable by a processor that is configured to interface and communicate with mail delivery service provider server 180 via network 260. In another implementation, user interface application 222 comprises a browser module that provides a network interface to browse information available over network 260. For example, user interface application 222 may be implemented, in part, as a web browser to view information available over network 260.

User device 220, in various embodiments, may include other applications 226 as may be desired in one or more embodiments of the present disclosure to provide additional features available to user 202. In one example, such other applications 226 may include security applications for implementing client-side security features, calendar application, contacts application, location-based services application, programmatic client applications for interfacing with appropriate application programming interfaces (APIs) over the network 260, and/or various other types of generally known programs and/or software applications. In still other examples, other applications 226 may interface with user interface application 222 for improved efficiency and convenience.

User device 220, in one embodiment, may include at least one user identifier 228, which may be implemented, for example, as operating system registry entries, cookies associated with user interface application 222, identifiers associated with hardware of user device 220, or various other appropriate identifiers. User identifier 228 may include one or more attributes related to user 202, such as personal information related to user 202 (e.g., one or more user names, passwords, photograph images, biometric IDs, addresses, phone numbers, social security number, etc.). In various implementations, user identifier 228 may be passed with a user login request to mail delivery service provider server 280 via network 260, and user identifier 228 may be used by mail delivery service provider server 280 to associate user 202 with a particular user account maintained by mail delivery service provider server 280.

Email server 230, in various embodiments, is maintained by an email service provider, such as Google®, Yahoo®, or Microsoft®, and is configured to manage email accounts for users. Email server 230 may receive emails from mail delivery service provider server 280 and route those emails to user device 220. Each email may include a header and a body, and may contain plain text, HTML (hypertext markup language), or other form of content. Email server 230 may store emails in accounts for users, and may enable the users to access the stored emails to read them. Email server 230 may organize emails in an email database. In various embodiments, email server 230 forwards emails to mail delivery service provider server 280.

Mail delivery service provider server 280, in various embodiments, may be maintained by a common carrier or a transporter of goods (e.g., Federal Express, DHL, UPS, or U.S. Postal Service). The mail delivery service provider may have a central location where physical mail is received and processed, or may be decentralized (e.g., multiple locations spread throughout an area).

Mail delivery service provider server 280 includes a mail conversion application 282, which may be adapted to interact with the user device 220 over the network 260 to facilitate the receipt and analysis of information from user device 220. In one example, the mail conversion application 282 is developed and provided by a service provider such as PayPal®, Inc. of San Jose, Calif., USA.

The mail delivery service provider server 280, in one embodiment, may be configured to maintain one or more user accounts in an account database 286 each of which may include account information 288 associated with one or more individual users (e.g., user 202). For example, account information 288 may include contact information of user 202, such as address (home address, business address, and email address) of user 202 and phone numbers.

In one implementation, the user 202 may have identity attributes stored with the mail delivery service provider server 280, and user 202 may have credentials to authenticate or verify identity with the mail delivery service provider server 280. User attributes may include personal information. In various aspects, the user attributes may be passed to the mail delivery service provider server 280 as part of a login, and the user attributes may be utilized by the mail delivery service provider server 180 to associate user 202 with one or more particular user accounts maintained by the mail delivery service provider server 280.

Mail delivery service provider server 280, in an embodiment, utilizes the mail conversion application 282 to convert physical mail to email and perform other functions described in the present disclosure. In various embodiments, the mail conversion application 282 receives one or more images of physical mail from a scanner, identifies a recipient of the physical mail, and determines whether the recipient is subscribed to a physical mail conversion service. In certain embodiments, the recipient is determined to be a subscriber and the physical mail is converted to an email. The mail conversion application 282 then transmits the email to email server 230 for routing to user device 220.

Figure 3:
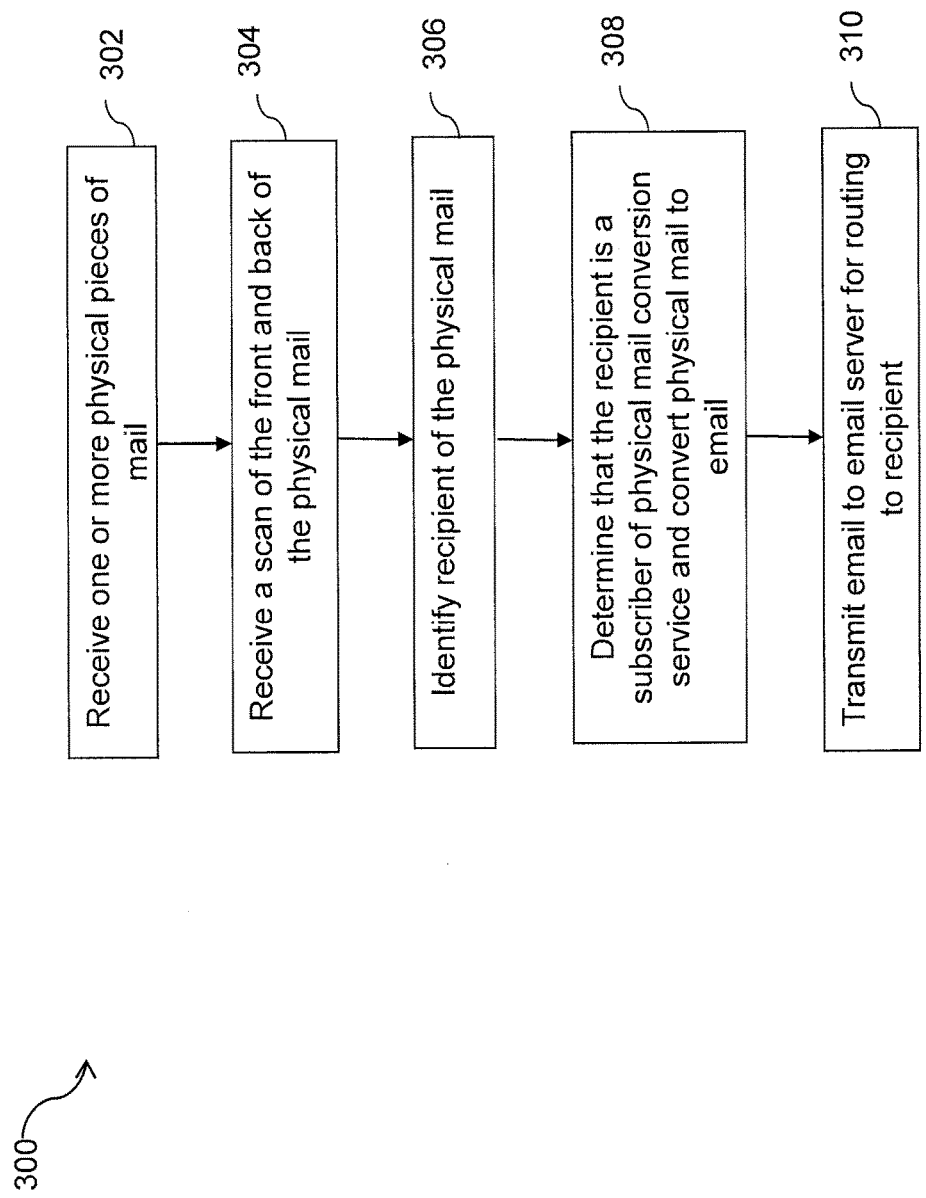
FIG. 3 is a flowchart showing a method of delivering physical mail via email according to an embodiment of the present disclosure.

Referring now to FIG. 3, a flowchart of a method 300 of delivering physical mail via email is illustrated according to an embodiment of the present disclosure. In various embodiments, the user 202 registers with a mail delivery service provider for the physical mail conversion service. Registration may include signing up for the service and agreeing to any terms required by the mail delivery service provider, such as through a user device. In one embodiment, the user device is a mobile computing device, such as a smartphone, a PC, or a computing tablet. In other embodiments, registration may be done completely through the user device, partially through the user device, or without using the user device, such as through a phone call or in-person visit to a representative of the mail delivery service provider.

The user may be requested to provider specific information for registration, such as, but not limited to, a name, address, phone number, email address, picture, a user name for the account, a password or PIN for the account, or other biometric identification such as a fingerprint. The type of information may depend on whether the user already has an account with the mail delivery service provider. Requested information may be entered through the user device or other means, including voice or manual key entry. Once all the requested information is received and confirmed, the mail delivery service provider may create an account for the user and subscribe the user to the physical mail conversion service.

At step 302, the mail delivery service provider server 280 receives one or more physical pieces of mail. Physical mail includes letters, postcards, coupons, advertisements, credit card offers, bills, flyers, paper checks, magazines, and any other type of document sent or carried in the postal system.

At step 304, the mail delivery service provider server 280 (e.g., mail conversion application 182) receives a scan(s) of the front and back of a physical piece of mail, including the envelope. Any suitable scanner can be used to scan each page of the physical mail, and its capture software configured to create images of each side of every page of the physical piece of mail.

At step 306, the mail delivery service provider server 280 identifies the recipient of the physical mail from the scan(s). The first page and/or envelope are analyzed by the mail service provider server 280 using, for example, optical character recognition (OCR) technology to convert the image to text. The text can then be searched for a name or address that is used to link the physical mail to a recipient (e.g., user 202).

At step 308, the mail delivery service provider server 280 determines that user 202 is a subscriber of the physical mail conversion service, and converts the physical mail to an email. For example, text and pictures from the scanned images can be extracted and placed in the body of an email. In another example, compressed images of the scanned images are embedded in the text of the email. Image scanning technology and QR code scanning technology aid in reading the front and back of the physical mail. This works in combination with subscriber look up and if found, an auto-generated email can be composed with the scanned data inserted into the email. This may be plain images pasted to the email body or even text auto-inserted into the email body or attachments or a combination of these.

In certain embodiments, the sender of the physical mail includes a QR code and/or a hyperlink to a URL. For example, the sender may include a QR code and/or a hyperlink when a response is requested from user 202. The mail delivery service provider server 280 reads the QR code and/or hyperlink, and embeds the QR code and/or hyperlink in the body of the email. When user 202 clicks on the hyperlink, he or she is transported to the corresponding website. In one embodiment, user 202 may be required to input a code for authentication (which may be provided in a separate email to user 202) before the website can be accessed.

In some embodiments, the mail delivery service provider server 280 reads the QR code and determines that a URL is embedded in the QR code. During conversion of the physical mail to an email, the mail delivery service provider server 280 includes the URL in the email rather than the QR code. When the user 202 clicks on the URL, he or she is transported to the corresponding website.

In other embodiments, the mail delivery service provider server 280 associates the relevant website or URL with the email action "respond virtually" in FIG. 1. That is, instead of presenting the URL to user 202, the "respond virtually" button is displayed. When user 202 clicks or otherwise selects the "respond virtually" button, the website corresponding to the URL is launched.

At step 310, the mail service provider server 280 transmits the email to the email server 130 for routing to user 202. When user 202 checks his or her email inbox, user 202 can read the email, and decide to delete the email, keep the email, or respond to the email.

In various embodiments, user 202 receives the email before the physical mail is delivered to a physical mailbox. Should user 202 choose to delete, trash, or discard the email, email server 230 would receive notification of this action. Email server 230 reports the deleted email to mail delivery service provider 280, who uses this information to prevent the corresponding physical mail from being delivered to user 202. In this way, unwanted physical mail can be identified and the delivery of junk mail can be stopped, thereby saving the mail delivery service provider time and energy, and clearing unwanted mail from user 202's physical mailbox. Mail delivery service provider can also inform the sender of the unwanted mail so that the sender can remove user 202 from their mailing list.

Advantageously, the described systems and methods provide a quick and efficient way for a user to access his or her physical mail via email. The user simply subscribes to a physical mail conversion service, and a mail delivery service provider converts physical mail addressed to the user into an email. Once the user receives the email, the user can perform multiple actions, including trashing the email and not allowing it to reach the user's physical mailbox, allowing the physical mail to be delivered, and responding to the email via the Internet, trashing the email, and not allowing the physical mail to reach the user's physical mailbox.

In some embodiments, paper checks can be cashed as soon as they reach the mail delivery service provider server 280 and user 202 is sent an email with an image of the front and back of the check. User 202 would simply submit the front and back images of the check to his or her bank, and once the bank verifies the check information, the check would be deposited into the user 202's bank account.

EXAMPLE

Exemplary methods of delivering physical mail via email will now be described.

American Express mails out a paper credit offer to Sam with a QR code on the front of the offer. The U.S. Postal Service (USPS) receives the paper credit offer, scans the front and back of each page of the paper credit offer, and converts the paper credit offer into an email. During the scanning, the USPS reads the QR code and determines that the QR code is associated with a URL. The USPS associates the URL with the email action "respond virtually," and the email is delivered to Sam. Sam chooses to respond virtually and asks that the paper credit offer be trashed or discarded. The USPS receives Sam's request and ensures that the paper credit offer is not delivered to Sam's physical mailbox.

Although email offers a fast and efficient communication medium and, to some extent, has replaced conventional mailing services, such as the U.S. Postal Service, and private mailing services, such as Federal Express or UPS, it is often necessary to send documents in physical form rather than, or in addition to, electronic form. For example, important documents such as court orders, wills, adoption papers, insurance documents, notices, and government communications are still required to be in paper form to establish their authenticity, as the electronic forms of these documents may not be considered valid for legal purposes. Correspondence involving such documents inevitably necessitates using conventional methods such as mailing by post or by courier.

In these cases, the postage associated with sending physical mail can be reduced. For example, the sender may be on the East Coast and need to send physical mail to someone on the West Coast. The sender can initiate the process by conveying a desire to send physical mail to the mail delivery service provider and indicating what should be placed inside and on an envelope. A volunteer on the West Coast receives the sender's request from the mail delivery service provider and agrees to send or deliver the physical mail to the designated recipient. The participant typically will be in the vicinity (e.g., same zip code) or near the location of the recipient. The volunteer prints out the physical mail and places it in a correctly addressed envelope to the recipient. The volunteer is provided an incentive (e.g., cash or some other type of reward) and personally delivers the mail or sends the mail through the mail delivery service provider (and is reimbursed postage expenses by the sender). In this way, the sender does not need to pay for postage from the East Coast to the West Coast. Alternatively, the mailing service provider e.g. USPS may provide such a service and may take up the volunteer's role by using only the last mile for physical mail delivery i.e. nearest USPS location is identified and physical mail is generated there and gets sent to the recipient.

Figure 4:
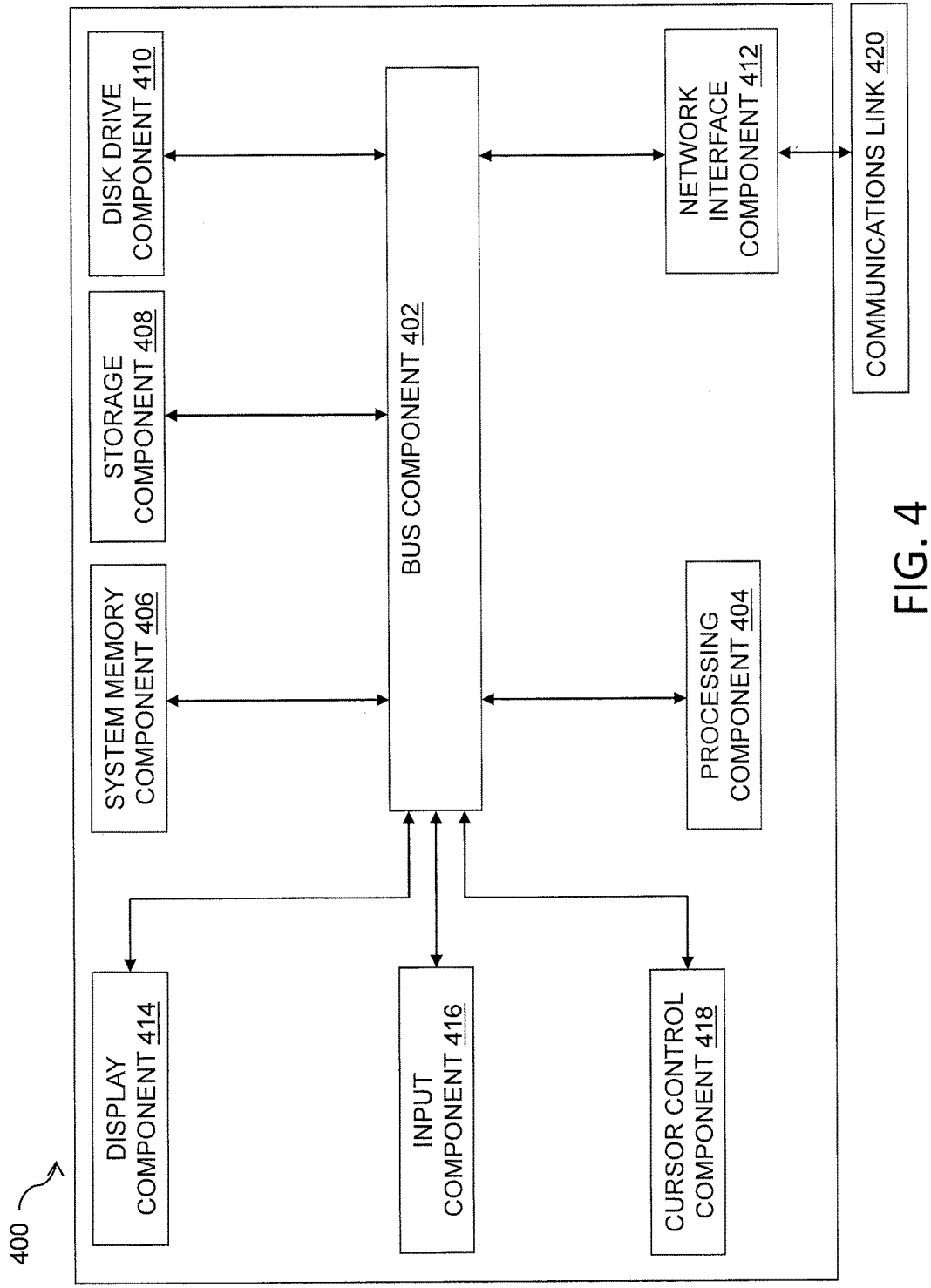
FIG. 4 is a block diagram of a system for implementing one or more components in FIG. 2 according to an embodiment of the present disclosure.

Referring now to FIG. 4, a block diagram of a system 400 is illustrated suitable for implementing embodiments of the present disclosure, including user device 220, email server 230, and mail delivery service provider server or device 280. System 400, such as part of a cell phone, a tablet, a personal computer and/or a network server, includes a bus 402 or other communication mechanism for communicating information, which interconnects subsystems and components, including one or more of a processing component 404 (e.g., processor, micro-controller, digital signal processor (DSP), etc.), a system memory component 406 (e.g., RAM), a static storage component 408 (e.g., ROM), a network interface component 412, a display component 414 (or alternatively, an interface to an external display), an input component 416 (e.g., keypad or keyboard), and a cursor control component 418 (e.g., a mouse pad).

In accordance with embodiments of the present disclosure, system 400 performs specific operations by processor 404 executing one or more sequences of one or more instructions contained in system memory component 406. Such instructions may be read into system memory component 406 from another computer readable medium, such as static storage component 408. In other embodiments, hardwired circuitry may be used in place of or in combination with software instructions for implementation of one or more embodiments of the disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, volatile media includes dynamic memory, such as system memory component 406, and transmission media includes coaxial cables, copper wire, and fiber optics, including wires that comprise bus 402. Memory may be used to store user information (e.g., contact information). In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 400. In various other embodiments, a plurality of systems 400 coupled by communication link 420 (e.g., network 260 of FIG. 2, LAN, WLAN, PTSN, or various other wired or wireless networks) may perform instruction sequences to practice the disclosure in coordination with one another. Computer system 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

In view of the present disclosure, it will be appreciated that various methods and systems have been described according to one or more embodiments for delivering physical mail via email.

Although various components and steps have been described herein as being associated with user device 220, email server 230 and mail delivery service provider server or device 280 of FIG. 2, it is contemplated that the various aspects of such servers illustrated in FIG. 2 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

What is claimed is:

1. A system for delivering physical mail via email comprising:
    a non-transitory memory; and
    one or more hardware processors coupled to the non-transitory memory and configured to read instructions from the non-transitory memory to cause the system to perform operations comprising:
        receiving a physical mail item comprising recipient information;
        scanning the physical mail item including the recipient information into an image file;
        extracting the recipient information from the image file to determine a recipient of the physical mail item by applying an optical character recognition technique on the image file;
        generating email content for the recipient by at least interpreting a code embedded in the image file;
        generating an email message for the recipient, wherein the generated email message comprises the generated email content;
        transmitting, over a network, the email message to a user device associated with the recipient based on an email address corresponding to the recipient before the physical mail item is delivered to the recipient;
        causing an email client executed on the user device to display the email message according to a modified setting, wherein the modified setting provides that a selection of a first graphical element in the email client corresponding to deleting the email message causes the email client to transmit a discard mail signal to the system;
        determining an indication for discarding the physical mail item by the recipient based on receiving the discard mail signal from the email client of the user device; and
        automatically stopping delivery of the physical mail item to the recipient.

2. The system of claim 1, wherein the email client includes a second graphical element that enables the recipient to respond electronically to the email message.

3. The system of claim 2, wherein the operations further comprise determining a URL link based on the code included in the physical mail item, wherein the modified setting further provides that a selection of the second graphical element causes the email client to redirect the recipient to a website based on the URL link.

4. The system of claim 1, wherein generating the email content comprises generating a URL link based on interpreting the code embedded in the image file.

5. The system of claim 4, wherein generating the email message comprises providing the URL link in a body of the email message.

6. The system of claim 1, wherein the operations further comprise determining that a URL link to a website is embedded in the code.

7. The system of claim 6, wherein generating the email message further comprises associating the URL link to the website with a third hyperlink provided in the email message.

8. The system of claim 1, wherein the email content comprises text and embedded images extracted from the scanned image file.

9. The system of claim 1, wherein the operations further comprise informing a sender of the physical mail item that the recipient did not want the physical mail item delivered in response to receiving the discard mail signal from the email client.

10. The system of claim 1, wherein the physical mail item comprises advertising or promotional material.

11. The system of claim 1, wherein the physical mail item includes at least one of a URL link or a Quick Response (QR) code.

12. The system of claim 1, wherein the physical mail item comprises a survey or a form.

13. A method of delivering physical mail via email comprising:
    determining, by one or more hardware processors, that a physical mail item is received, wherein the physical mail item includes a plurality of pages and recipient information;
    scanning, by the one or more hardware processors, the physical mail item into an image file;

extracting, by the one or more hardware processors, the recipient information from the image file to determine a recipient of the physical mail item by applying an optical character recognition technique on the image file;

generating, by the one or more hardware processors, email content for the recipient by at least interpreting a code embedded in the image file;

generating, by the one or more hardware processors, an email message for the recipient, wherein the generated email message comprises the generated email content;

transmitting, by the one or more hardware processors over a network, the email message to a user device associated with the recipient based on an email address corresponding to the recipient;

causing, by the one or more hardware processors, an email client executed on the user device to display the email message according to a modified setting, wherein the modified setting provides that a selection of a first graphical element in the email client corresponding to deleting the email message causes the email client to transmit a discard mail signal to the system;

determining, by the one or more hardware processors, an indication for discarding the physical mail item by the recipient based on receiving the discard mail signal from the email client of the user device; and automatically stopping, by the one or more hardware processors, delivery of the physical mail item to the recipient.

14. The method of claim 13, wherein the physical mail item comprises a credit offer.

15. The method of claim 13, further comprising determining, from a plurality of stored email addresses, that the email address corresponds to the recipient.

16. The method of claim 13, wherein the email message is transmitted to the recipient before the physical mail item is delivered.

17. A non-transitory machine-readable medium having stored thereon machine-readable instructions executable to cause a machine to perform operations comprising:

receiving a physical mail item comprising recipient information;

scanning the physical mail item including the recipient information into an image file;

extracting the recipient information from the image file to determine a recipient of the physical mail item by applying an optical character recognition technique on the image file;

determining that the physical mail item includes a Quick Response (QR) code;

determining a URL link to a website by interpreting the QR code;

generating, for the recipient, email content based on the image file;

generating an email message for the recipient, wherein the generated email message comprises the generated email content;

transmitting, over an electronic network, the email message to a user device associated with the recipient based on an email address corresponding to the recipient;

causing an email client executed on the user device to display the email message according to a modified setting, wherein the modified setting provides that a selection of a first graphical element in the email client corresponding to deleting the email message causes the email client to transmit a discard mail signal to the system;

determining an indication for discarding the physical mail item by the recipient based on receiving the discard mail signal from the email client of the user device; and automatically stopping delivery of the physical mail item to the recipient.

18. The non-transitory machine-readable medium of claim 17, wherein the physical mail item comprises a form or a survey.

19. The non-transitory machine-readable medium of claim 17, wherein the email message is transmitted to the recipient before the physical mail item is delivered.

20. The non-transitory machine-readable medium of claim 17, wherein the email client includes a second graphical element corresponding to responding electronically to the email message, wherein the modified setting further provides that a selection of the second graphical element causes the email client to redirect the recipient to a website based on the URL link.

* * * * *